United States Patent Office 2,700,759
Patented Jan. 25, 1955

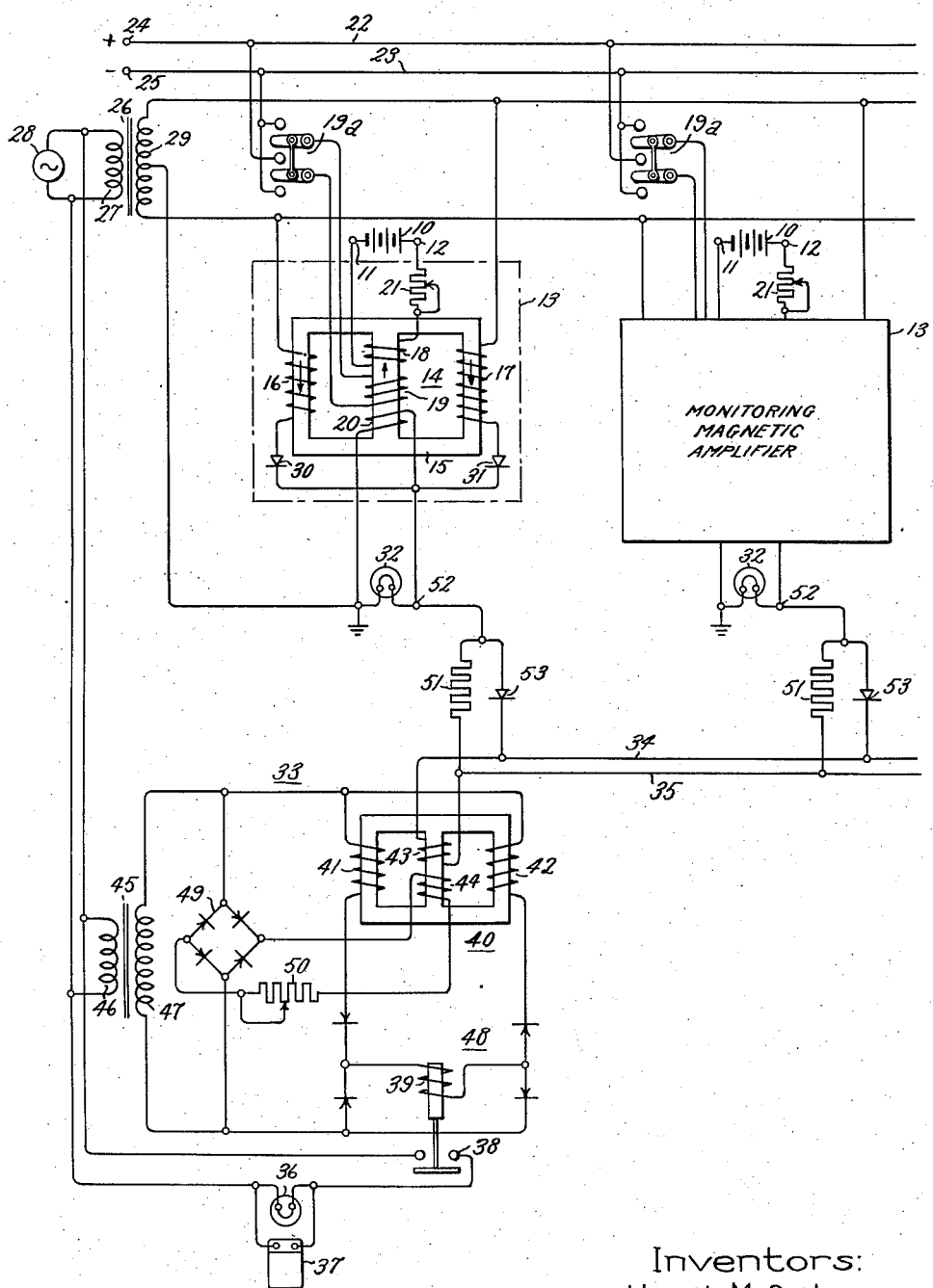

2,700,759

MONITORING APPARATUS

Hugh M. Ogle and Vernon J. Wattenberger, Schenectady, N. Y., assignors to General Electric Company, a corporation of New York Application August 11, 1951, Serial No. 241,484

9 Claims. (Cl. 340—253)

Our invention relates to monitoring apparatus, and more particularly to apparatus for monitoring a plurality of electrical signals, such as voltages or currents, which may be generated by the monitored device or devices. The monitoring apparatus provides an indication of an undesired change in any of the monitored signals.

Many modern machines and industrial devices and processes now require complicated and sometimes duplicated electric control circuits which are energized by a plurality of significant generated or derived voltages or currents often located or occurring at points remote from one another. It is important that a change in any one of these significant electrical quantities above or below a predetermined critical value may be detected immediately so that the electrical energy source or circuit responsible for the electric signal concerned may be replaced or repaired before the malfunctioning of the circuits affected by the changed electrical quantity produces a complete breakdown of the entire apparatus or irrevocable damage to any material in process.

One object of our invention, therefore, is to provide an improved voltage monitoring apparatus which gives an immediate indication at a central control point whenever any one of the monitored electric signals ranges beyond its critical value.

Another object of our invention is to provide monitoring apparatus which gives an immediate indication of the particular electric signal that has changed from among the many monitored signals.

A further object of our invention is to provide monitoring apparatus which is completely static in nature and which does not require the use of devices such as electron discharge devices which must be periodically replaced as they wear out.

In general, our invention comprises separate electric signal responsive means connected to each of the electrical signals to be monitored and functioning to provide a voltage of one predetermined amplitude when the monitored signal has a desired magnitude within a critical value and a voltage of a higher different amplitude when the monitored signal ranges in a predetermined direction beyond its critical value. This higher amplitude voltage is utilized to energize an alarm device which indicates the particular signal that has changed. Means responsive to the difference in voltage between the average voltage output of all the monitoring signal-responsive means and the maximum output voltage produced by any one of the monitoring signal-responsive means are also provided for energizing a common alarm device located at a remote control point.

In the preferred embodiment of our invention the individual electrical signal-responsive means associated with each monitored voltage comprises a magnetic amplifier circuit constructed to move with an extremely fast snap action between two steady-state output voltage conditions determined by whether the monitored signal is above or below a predetermined critical value. The means for energizing the remotely located alarm device also preferably comprises a common sensitive magnetic amplifier circuit which, in turn, is connected to receive an input signal representing the difference in voltage between the average voltage produced in the output circuit of each of the individual monitoring magnetic amplifiers and the maximum amplitude voltage output of any one of these monitoring magnetic amplifiers. If all of the monitored signals are within their respective critical values, there is little or no difference between the integrated average voltage output and the individual maximum amplitude voltage output and no energization of the common remote alarm device results. However, if one of the monitoring magnetic amplifiers "fires" as a result of an unusual change in its monitored signal, there is little resulting change in the integrated average output voltage but a considerable change in the individual maximum output voltage, with the result that a large difference voltage exists to energize the common remotely located magnetic amplifier circuit.

The novel features which we believe to be characteristic of the invention are set forth in the appended claims. The invention itself, however, together with further objects and advantages thereof may best be understood by reference to the following description taken in connection with the accompanying drawing in which the sole figure is a schematic circuit diagram of the various components and connections of a preferred embodiment of our invention.

Referring to the drawing, the electrical signals to be monitored are shown as being unidirectional in character and derived from battery cells 10, each connected between the terminals 11 and 12 of a respective one of a number of monitoring magnetic amplifiers 13. Although the electric signals to be monitored are represented by voltages derived from battery cells, any generated or derived voltages as well as any generated or derived currents may be applied between terminals 11 and 12. Various energy conversion elements such as thermostatic, photoelectric or piezoelectric elements (not shown) may, of course, be employed to derive electric signals responsive to other forms of energy such as heat, light, or mechanical pressure.

Only two battery cells 10 and two monitoring magnetic amplifiers 13 are shown in the drawing; one of these monitoring magnetic amplifiers being shown in full schematic diagram form while the other monitoring magnetic amplifier is shown in block diagram form. Although only two such monitoring magnetic amplifiers are shown in the drawing, it is to be understood that many more may be connected in the same manner in order to monitor a greater number of signals.

The monitoring magnetic amplifier 13 is shown as comprising a saturable reactor 14 having a 3-legged core 15 with at least one and preferably a pair of reactance windings 16 and 17 wound on the outer legs thereof and three saturation controlling windings 18, 19, and 20 wound on the center leg thereof. Winding 18 is connected in series with a variable resistance 21 and terminals 11 and 12 to be energized by a monitored signal applied between these terminals. Winding 19 is connected through a polarity reversing switch 19a across a pair of conductors 22 and 23 which, in turn, are connected through terminals 24 and 25, respectively, to an accurately maintained source of constant unidirectional reference voltage (not shown) indicated by the symbols + and —. This reference voltage may be provided by any of the well-known types of voltage regulated power supplying circuits preferably of the type employing a magnetic reference as the stabilizing component. Power for energizing the reactance windings of the reactor 14 is obtained from any suitable alternating voltage source such as provided by a transformer 26 having a center-tapped secondary winding 29 and a primary winding 27 adapted to be connected across a source of alternating voltage 28. Reactance windings 16 and 17 are connected from opposite ends of the secondary winding 29 in series, respectively, with separate similarly poled rectifiers 30 and 31 to one side of an alarm device 32 connected between a common connection of the rectifiers 30 and 31 and the center tap of transformer secondary winding 29. Alarm device 32 is shown as an indicating lamp and constitutes the load upon the magnetic amplifier circuit 13. Control winding 20 is connected across the alarm device 32 and constitutes a feedback signal control winding, as will be more fully explained hereinafter. Alarm device 32 functions to give an immediate visual indication whenever the voltage produced by battery cell 10 falls below a predetermined critical value.

Rectifiers 30 and 31 are similarly poled relative to the alternating voltage source comprising secondary winding 29 so that a unidirectional current tends to flow through indicating lamp 32 as a result of similarly directed current pulses flowing through alternate reactance windings 16 and 17 during alternate half-cycles of source voltage. Reactance windings 16 and 17 are wound, as indicated by the arrows, to produce mutually additive flux in the center leg of core 15 during their alternate conducting periods. Similarly, feedback winding 20 is also wound in a direction to produce magnetic flux in core 15 tending to aid the saturation of the core whenever current flows through this feedback winding 20 as a result of an energizing voltage applied to lamp 32 connected in parallel with the feedback winding 20.

In monitoring the voltage output of battery cells we are concerned with a drop in voltage, and switch 19a is therefore thrown to a position such that the polarity of the reference voltage supplied to conductors 22 and 23 causes a current in bias winding 19 producing flux in the same direction as the flux produced by the reactance windings 16 and 17. If it is desired to monitor a signal which tends to rise in magnitude, switch 19a is thrown to an opposite position to produce a reference current in bias winding providing a flux in opposition to that produced by reactance windings 16 and 17.

The control winding 18, however, is wound and connected to the signal to be monitored in proper direction to cause a current flow in the control winding 18 which produces flux in core 15 in opposition to that produced by the reference bias winding 19. In other words, if an alarm is desired whenever the monitored signal drops below a critical value, the signal is supplied to control winding 18 with a polarity to produce a signal flux opposing both the reactance winding flux and the bias winding flux. If, on the other hand, an alarm is desired upon a rise in the monitored signal above a critical value, an opposite polarity signal connection is used to produce a signal flux aiding the reactance winding flux but opposing the previously reversed polarity bias winding flux.

In order to provide means for energizing a common alarm device which may be located at a point remote from the location of the voltages to be monitored, we provide another magnetic amplifier circuit 33 connected to be energized in accordance with a predetermined difference voltage existing between a pair of input conductors 34 and 35. The common remotely located alarm device is shown as an indicating lamp 36 connected in series with the contacts 38 of a relay 39 and the alternating voltage source 28. Other types of alarm devices, for example, sound alarms such as buzzer 37, may be connected in parallel with lamp 36, as shown, or may be substituted therefor. The alarm devices, such as lamp 36 and buzzer 37, are, of course, energized upon the closing of the contacts 38 of relay 39.

Magnetic amplifier circuit 33 may be any known type adapted to energize a load device, such as relay 39, upon the delivery of an electric signal of predetermined magnitude to a control winding thereof. In the drawing there is shown one particularly well suited magnetic amplifier of the type described and claimed in U. S. patent application 213,277 filed by Raymond E. Morgan February 28, 1951 as a continuation-in-part of application 94,577 filed May 21, 1949 and assigned to the same assignee as the present invention. Magnetic amplifier 33 comprises a 3-legged core saturable reactor 40 having reactance windings 41 and 42 wound on the outer legs of the core, and an input signal control winding 43 and a bias winding 44 wound on the central legs thereof. Power for the reactance winding is obtained by virtue of a transformer 45 having its primary winding 46 connected across alternating voltage source 28, and its secondary winding 47 connected to supply power to the reactance windings 41 and 42 through a bridge-type full-wave rectifier 48. The pickup coil of relay 39 is connected as the diagonal of bridge rectifier 48 and the reactance windings 41 and 42 are connected in respective alternate conducting paths of bridge rectifier 48. The bias voltage for winding 44 is conveniently obtained from a bridge rectifier 49 having its input alternating voltage terminals connected across the secondary of transformer 47 and having its output unidirectional voltage terminals connected through a current limiting variable resistance 50 in series with winding 44.

In order to produce a voltage between conductors 34 and 35 which represents the difference between the average integrated output voltage of all the signal monitoring magnetic amplifiers 13 and the individual maximum amplitude output voltage produced by any one of these monitoring magnetic amplifiers, separate impedance elements such as resistors 51, preferably having identical resistance, are connected from one of the conductors, such as conductor 35, to the high voltage output terminal 52 of each monitoring magnetic amplifier 13; and separate unidirectional impedances, such as rectifiers 53, are connected from the other conductor, such as conductor 34, to the same high voltage output terminal 52 of each monitoring magnetic amplifier 13. Rectifiers 53 are polarized in the same direction relative to output terminal 52 as the direction of current flow through alarm lamp 32 as a result of the polarity of rectifiers 30 and 31; which in the circuit of Fig. 1 is an easy flow direction away from output terminal 52.

The operation of our invention may be easily understood by presuming initially that no signal to be monitored is supplied to terminals 11 and 12 so that control winding 18 produces no flux in core member 15 of reactor 14. Where it is desired to detect a drop in the magnitude of the signal to be supplied to amplifier 13, the reference voltage is applied to bias winding 19 through switch 19a with a polarity producing bias winding flux aiding the reactance winding flux and has sufficient magnitude either to produce saturation of core 15 by the action of bias winding 19 alone, or to enable core 15 to be driven to saturation upon the initial rise of alternating voltage supplied across the reactance windings 16 and 17. Under this core saturated condition there is an easy current conduction path through the reactance windings 16 and 17, and indicating lamp 32 is lit by the current alternately flowing through the reactance windings 16 and 17 and their associated rectifiers 30 and 31 during respective opposite polarity half-cycles of the alternating voltage power source 28. Due to the impedance of lamp 32, a voltage drop is produced across the lamp which produces a current through feedback winding 20 to accelerate the saturation of core 15 and thereby hasten the time of "firing" of the magnetic amplifier 13. When a signal whose excessive drop in magnitude is to be detected is supplied across terminals 11 and 12, and resistor 21 is adjusted to a proper value, the flux opposition to the saturating flux produced by the resulting current in signal control winding 18 is sufficient to prevent the core 15 from ever reaching saturation. As a result, magnetic amplifier 13 never "fires" and only a small current not sufficient to light lamp 32 flows through reactance windings 16 and 17. If the monitored signal, such as the output voltage of battery cell 10, thereafter decreases to an extent permitting reactor 14 to reach saturation during some portion of the alternating voltage source cycle, increased current thereupon begins to flow through the reactance windings 16 and 17 producing a marked voltage drop across lamp 32 providing a signal for the feedback winding 20. This feedback signal produces flux aiding the reactance winding flux, and this regenerative action quickly produces full saturation of core 15 to enable full current to flow through the reactance windings 16 and 17 without any substantial impedance due to the saturable core 15, thereby lighting lamp 32.

Where it is desired to provide an alarm upon the occurrence of an excessive rise in the magnitude of the monitored signal, both the polarity of the reference voltage supplied to bias winding 19 and the polarity of the signal supplied to control winding 18 are reversed. As a result, the bias winding flux tends to prevent core saturation while the signal winding flux tends to aid core saturation. Resistor 21 is adjusted so that the bias winding flux has predominant control and is sufficient to prevent core 15 from reaching saturation. An increase in the magnitude of the monitored signal to an extent permitting reactor 14 to reach saturation during the alternating voltage source cycle thereupon provides a signal for feedback winding 20, causing magnetic amplifier 13 to "fire" in the same manner as described above.

It is to be noted that we have shown a voltage feedback connection for winding 20. This is to take advantage of the increase in resistance of lamp 32 when it lights, which resistance change aids the build-up of voltage thereacross. With other types of constant resistance or decreasing resistance alarm devices a current feedback connection, i. e., where the alarm device is connected in series with winding 20, may be more advantageous. Moreover, by properly proportioning feedback winding 20 relative to reactance windings 16 and 17, a hysteresis effect can be introduced into the control characteristic of reactor 14 upon firing, such that lamp 32 will remain lit even though the monitored signal should return to a tolerable value. Momentary excursions of the monitored signal beyond its critical value can thus be made to give a permanent indication since the alarm device once energized will continue to operate until the magnetic amplifier 13 is reset such as by momentarily interrupting the power supplied thereto from source 28.

If a voltage feedback connection, such as illustrated in the drawing, is made to winding 20, this alarm sustaining hysteresis effect can be introduced by employing sufficient turns on winding 20 to produce a magnetomotive force in core 15 about or above twice that required to drive the core to saturation. If a current feedback connection is made to winding 20, a turn ratio relative to reactance windings 16 or 17 of about or above 1 to 10 is usually sufficient to produce this hysteresis effect.

In order to set adjustable resistor 21 to its proper value, it is only necessary to supply a signal to terminals 11 and 12 which has a magnitude equal to the critical value above or below which it is undesirable that the monitored voltage should range. With this critical value signal applied to the terminals 11 and 12, resistor 21 is adjusted until core member 15 is at the threshold of saturation with indicating lamp 32 in an extinguished condition. The signal to be monitored may thereafter be substituted for this critical value signal and indicating lamp 32 will light whenever the monitored signal ranges beyond this critical value. Since each monitoring magnetic amplifier 13 may be individually adjusted to fire at a different value of critical signal, it is not necessary that the monitored signals all have the same magnitude, which fact substantially increases the utility of our invention. Each of the monitoring magnetic amplifiers associated with the various monitored voltages, however, is preferably substantially identical in construction and the voltage produced at the output terminal 52 of each magnetic amplifier will normally be approximately the same under the respective conditions of energization and non-energization of indicating lamp 32.

The common magnetic amplifier circuit 33 for energizing the remote alarm devices 36 and 37 operates in the following manner. Presuming that all the monitored signals, such as the output voltages of cells 10, are above their respective critical values, none of the lamps 32 will be lit, none of the saturable reactors 14 will be in a saturated condition, and most of the alternating source voltage 28 will be dissipated across the reactance windings 16 and 17 with only a very small voltage existing at output terminal 52 of the respective monitoring magnetic amplifiers 13. Although the voltage existing at output terminal 52 is unidirectional in character, it is substantially unfiltered and has a pulsating or ripple component due to the alternating character of the power source. Due to the common connection of conductor 35 through separate resistors 51 to the respective output terminals of the monitoring amplifiers 13, conductor 35 effectively supplies to one side of winding 43 an average component of the various voltages existing at the output terminals 52 of the monitoring magnetic amplifiers 13. Due to the low impedance in the forward direction of rectifiers 53 connected between conductor 34 and the output terminal 52 of each monitoring magnetic amplifier 13, the voltage supplied to conductor 34 by each magnetic amplifier 13 is substantially the maximum voltage appearing at its output terminal 52. Moreover, due to the high impedance of rectifiers 53 to current in a reverse direction, there is no appreciable coupling through the rectifiers 53 from one monitoring magnetic amplifier to another. Consequently, the voltage appearing upon conductor 34 is the highest voltage produced at the output terminal 52 of any of the monitoring magnetic amplifiers 13. Since the voltage at output terminals 52 is quite low when none of the monitored voltages 10 range beyond their respective critical values, there is little difference in voltage between the maximum and average voltage components of these output voltages appearing respectively on conductors 34 and 35 under these conditions, and the small difference is not sufficient to energize magnetic amplifier 33.

If, however, one of the monitored signals produced by cells 10 ranges beyond its predetermined critical value, core 15 of the associated reactor is quickly saturated, reactance windings 16 and 17 become conductive, and a greater portion of the alternating source voltage drop appears across alarm lamp 32 to light lamp 32 and to produce a much higher pulsating voltage at output terminal 52 of that particular monitoring magnetic amplifier 13. Due to the common resistive interconnection between conductor 35 and all of the output terminals 52 of all of the monitoring amplifiers, the change in an average unidirectional component of the pulsating output voltage, occasioned by the firing of one of the monitored magnetic amplifiers is distributed throughout the interconnected system of magnetic amplifiers so that only a small change in the voltage appearing on conductor 35 results. The change in voltage at the output terminal of the fired magnetic amplifier 13 is, of course, much greater than the change in the average unidirectional component of the output pulsating voltage of all the magnetic amplifiers 13. Since, as explained previously, the voltage appearing upon conductor 34 is a voltage substantially equal to the highest amplitude voltage produced by any one of the monitoring magnetic amplifiers, there is an appreciable voltage difference between the voltage on conductors 34 and 35 when one of the monitored signals varies beyond, which in the illustrated case of monitored cell voltages means that the voltage drops below, its critical value. If magnetic amplifier 33 is biased to a proper operating point, this substantial difference voltage is sufficient to cause conduction in the reactance windings 41 and 42 of magnetic amplifier 33 and a consequent energization of relay 39. When relay 39 is energized, contacts 38 are closed to cause lamp 26 and buzzer 37 to operate, giving an appropriate alarm. The proper biasing voltage to maintain saturable reactor 40 in a non-saturated condition when none of the monitoring magnetic amplifiers 13 have fired may be obtained by adjustment of variable resistor 50.

It will, of course, be appreciated that although only one stage of common magnetic amplification 33 is shown, additional stages of amplification may be included between magnetic amplifier 33 and relay 39 if greater sensitivity is desired or needed. Similarly, additional signal amplifying means may be interposed between the signals to be monitored and the terminals 10 and 11 of each monitoring magnetic amplifier 13. Moreover, although a particular preferred type of monitoring magnetic amplifier 13 is described above, it will be appreciated that any type of signal responsive means capable of producing output voltages varying between two steady state conditions in response to a predetermined variation in signal magnitude may alternatively be employed. For example, a magnetic amplifier similar to bridge-type magnetic amplifier 33 may be substituted for the illustrated monitoring magnetic amplifiers 13 by merely employing three control windings connected in the manner of windings 18, 19, and 20 on reactor 40 of magnetic amplifier 33.

It is therefore to be understood that although we have shown a particular embodiment of our invention, many modifications may be made, and we intend, by the appended claims, to cover all such modifications falling within the true spirit and scope of our invention.

What we claim as new and desire to secure by Letters Patent of the United States is:

1. Monitoring apparatus for detecting undesired changes in electric signals, comprising separate signal-responsive means adapted to be connected to each signal to be monitored for providing an output voltage of a first substantially same amplitude when the monitored signal is at a desired value and an output voltage of a second higher amplitude when the monitored signal ranges beyond a critical value, a first conductor, means interconnecting all said signal-responsive means with said first conductor for supplying a voltage to said first conductor representing an average voltage component of the output voltages produced by all said signal-responsive means, a second conductor, means interconnecting all said signal-responsive means with said second conductor for supplying a voltage to said second conductor representing the maximum amplitude output voltage produced by any one of said signal-responsive means, an alarm device, and means connected between said conductors and said alarm device for energizing said alarm device responsive to a voltage difference between said first and second conductors.

2. Monitoring apparatus for detecting excessive changes in unidirectional electric signals beyond respective critical values comprising a plurality of signal-responsive means each adapted to be connected to a respective signal to be monitored for providing an output voltage of a first same amplitude when the monitored signal is within its critical value and an output voltage of a second different amplitude when the monitored signal ranges in a predetermined direction beyond its critical value, a first conductor, a separate impedance element connected from said first conductor to each signal-responsive means to receive the output voltage thereof, a second conductor, separate unidirectional impedance elements connected from said second conductor to each signal-responsive means to receive the output voltage thereof, an alarm device, and means responsive to a predetermined voltage difference between the voltages on the first and second conductors for energizing said alarm device.

3. Monitoring apparatus for detecting excessive changes in electric signals comprising a plurality of magnetic amplifiers each having a pair of input terminals for connection to a different signal to be monitored and having an output terminal, each magnetic amplifier being constructed to provide at its output terminal a voltage of a first same amplitude when the monitored signal has a desired value and a second different amplitude when the magnitude of the monitored signal ranges in a predetermined direction beyond a predetermined critical value, a first conductor, separate resistors of substantially identical resistance connected from said first conductor to the output terminal of each magnetic amplifier, a second conductor, separate rectifiers connected from said second conductor to the output terminal of each magnetic amplifier, an alarm device, and means responsive to a predetermined voltage difference between the voltages on said first and second conductors for energizing said alarm device.

4. Monitoring apparatus for detecting a decay in one out of a plurality of unidirectional voltages below a predetermined critical value, comprising a plurality of magnetic amplifiers each having a pair of input terminals for connection to a different signal to be monitored and having an output terminal, each magnetic amplifier being constructed to provide at its output terminal a voltage of a first same amplitude when the monitored voltage is above the critical value and a voltage of a second higher amplitude when the monitored voltage drops below the critical value, a first conductor, separate resistors of substantially identical resistance connected from said first conductor to the output terminal of each magnetic amplifier, a second conductor, separate rectifiers connected from said second conductor to the output terminal of each magnetic amplifier, an alarm device, and means responsive to a predetermined voltage difference between the voltages on said first and second conductors for energizing said alarm device.

5. Monitoring apparatus for detecting a rise in one out of a plurality of unidirectional voltages above a predetermined critical value, comprising a plurality of magnetic amplifiers each having a pair of input terminals for connection to a different signal to be monitored and having an output terminal, each magnetic amplifier being constructed to provide at its output terminal a voltage of a first same amplitude when the monitored voltage is below the critical value and a voltage of a second higher amplitude when the monitored voltage rises above the critical value, a first conductor, separate resistors of substantially identical resistance connected from said first conductor to the output terminal of each magnetic amplifier, a second conductor, separate rectifiers connected from said second conductor to the output terminal of each magnetic amplifier, an alarm device, and means responsive to a predetermined voltage difference between the voltages on said first and second conductors for energizing said alarm device.

6. In combination, a plurality of voltage sources variable between two predetermined steady-state voltage conditions, a first conductor, separate resistors connected from said first conductor to each voltage source, a second conductor, separate rectifiers connected from said second conductor to each voltage source, a load device, and means responsive to a predetermined voltage difference between the voltages on said first and second conductors for energizing said load device.

7. In combination, a plurality of voltage sources variable between two predetermined steady-state voltage conditions, a magnetic amplifier circuit having a pair of input terminals, an alarm device connected to be energized by said magnetic amplifier circuit upon the application of a voltage of predetermined amplitude to said input terminals, a separate resistor of substantially identical resistance connected from each voltage source to one of said input terminals for supplying a voltage to said one input terminal representing an average unidirectional component of the voltage of all said sources, and a separate rectifier connected from each voltage source to the other input terminal for supplying a voltage to said other input terminal representing the maximum amplitude voltage of all said sources.

8. Monitoring apparatus for detecting an excessive change in one unidirectional electric signal from among a plurality of such signals, comprising a plurality of monitoring magnetic amplifiers each having a pair of input terminals adapted to be connected to a different signal to be monitored and having an output voltage terminal, each monitoring magnetic amplifier being constructed to provide a voltage at its output terminal of a same magnitude when the monitored signal has a desired value and an output voltage of a higher magnitude when the monitored voltage ranges beyond a predetermined critical value, a second magnetic amplifier, an alarm device connected to be energized by said second magnetic amplifier when a voltage of a predetermined magnitude is supplied to its input terminals, separate substantially identical resistors connected between the output terminal of each monitoring magnetic amplifier and one of the input terminals of said second magnetic amplifier for providing a voltage to said one input terminal representing an average component of the output voltages produced by all the monitoring magnetic amplifiers, and separate rectifier elements connected between the output terminal of each monitoring magnetic amplifier and the other input terminal of said second magnetic amplifier for supplying a voltage to said other input terminal representing the highest magnitude voltage produced by any of said monitoring magnetic amplifiers.

9. A monitoring circuit for detecting momentary excursions in unidirectional signal voltages beyond a predetermined critical value, comprising a saturable reactor having at least one reactance winding and at least three control windings, a source of alternating voltage, an alarm device and a current rectifier connected in series with said reactance winding and said alternating voltage source whereby said alarm device is energized by a predetermined magnitude of current conduction through said reactance winding, a source of constant reference voltage connected to a first one of said control windings and producing flux in said reactor of predetermined polarity relative to the flux produced therein by said reactance winding, a second one of said control windings being arranged to produce a flux in said reactor opposing the flux produced by said first control winding when connected to a voltage to be monitored, means for adjusting the magnitude of the current in said second control winding to maintain said reactance windings substantially non-conducting when a monitored signal voltage has a desired value, a third one of said control windings being connected in circuit relation with said alarm device and being arranged to produce flux in said reactor aiding the flux produced therein by said reactance winding whereby said reactor quickly reaches saturation when the monitored voltage varies in a predetermined direction to an extent rendering said reactance winding conductive, said third winding flux being constructed to exert a magnetomotive force above twice that required to saturate said core, thereby to produce a hysteresis effect in said reactor rendering said control winding ineffective.

References Cited in the file of this patent

UNITED STATES PATENTS

| | | |
|---|---|---|
| 2,112,228 | Crago | Mar. 29, 1938 |
| 2,278,516 | Gulliksen | Apr. 7, 1942 |
| 2,337,253 | Lamm | Dec. 21, 1943 |
| 2,414,936 | Edwards, et al. | Jan. 28, 1947 |
| 2,464,639 | Fitzgerald | Mar. 15, 1949 |
| 2,504,965 | Davis | Apr. 25, 1950 |
| 2,512,317 | Edwards et al. | June 20, 1950 |
| 2,512,639 | Gohorel | June 27, 1950 |
| 2,565,323 | Quinn | Aug. 21, 1951 |